Dec. 18, 1928.  W. A. CLENCH  1,695,798

MANUAL RIM LOCK

Filed Nov. 23, 1926   2 Sheets-Sheet 1

Inventor
William A. Clench
By H.L. & C.L. Reynolds
Attorneys

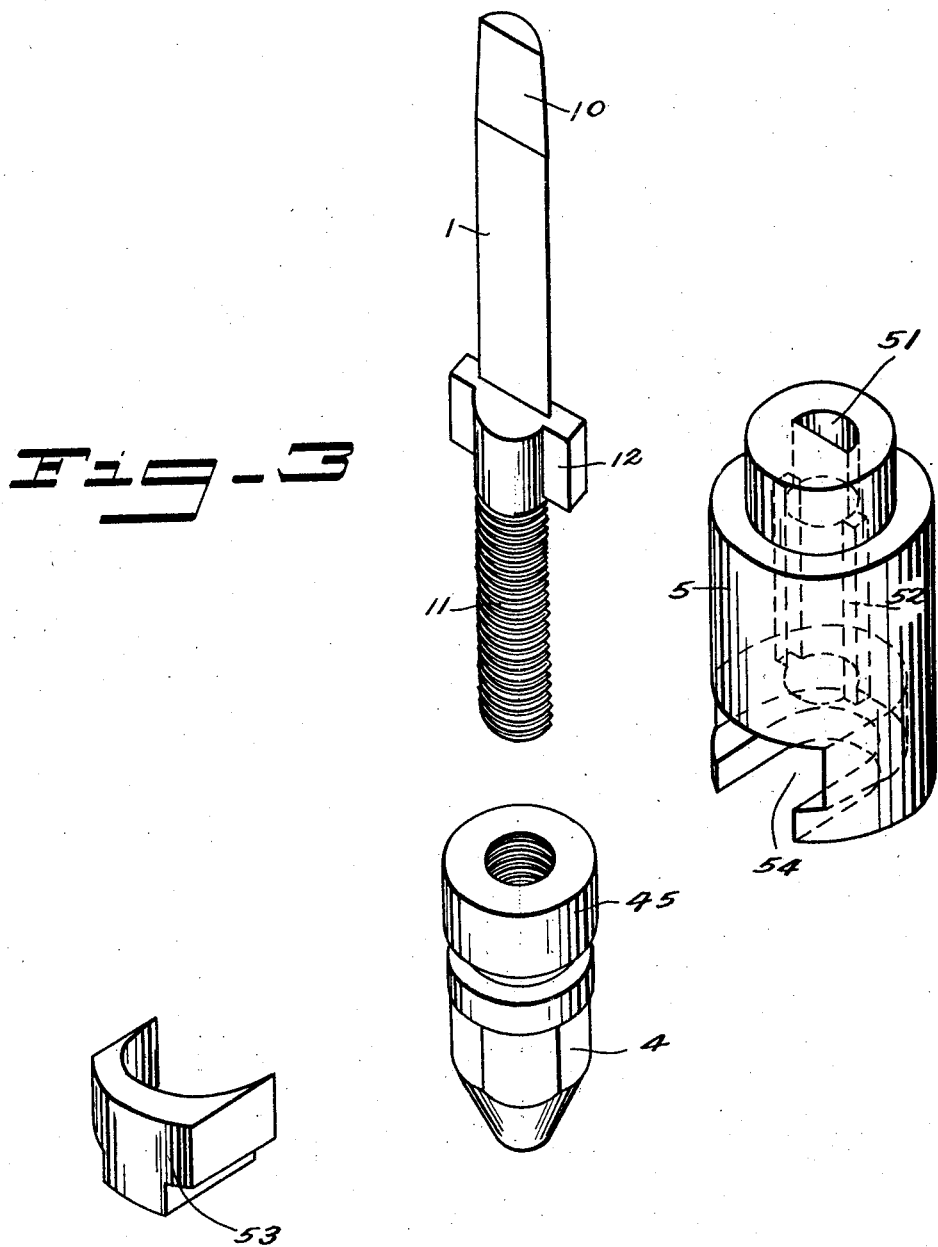

Patented Dec. 18, 1928.

1,695,793

UNITED STATES PATENT OFFICE.

WILLIAM A. CLENCH, OF VANCOUVER, BRITISH COLUMBIA, CANADA.

MANUAL RIM LOCK.

Application filed November 23, 1926. Serial No. 150,174.

My invention relates to means for setting up and holding demountable rims upon wheels, and is particularly directed to a means which can be conveniently set up by hand.

It is an object of my invention to provide a simple device by means of which the rim may be forced upon an inclined felly to secure it firmly, much in the manner that the rims are secured in my Patent No. 1,476,952, but without the necessity of employing actuating means within the hub of the wheel. Thus, it is an object to provide such a rim locking means which is comparatively inexpensive, yet as effective as the devices shown in my patent referred to above. A further object is to provide such a manually operable device, no part of which is ordinarily separable from the whole.

Further objects may be ascertained as the specification progresses.

My invention comprises the novel parts and the novel combinations thereof, as shown in the accompanying drawings, described in the specification, and particularly defined by the claims terminating the same.

In the accompanying drawings, I have shown my invention in forms which are now preferred by me.

Figure 3 is an exploded view, showing the several parts co-operating to form my present device, in perspective;

Figure 4:
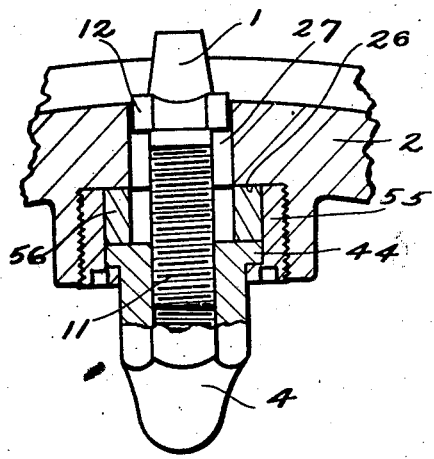
Figure 4 is a section at right angles to Figure 1, but illustrating a modified form of locking bolt.
Figure 1:
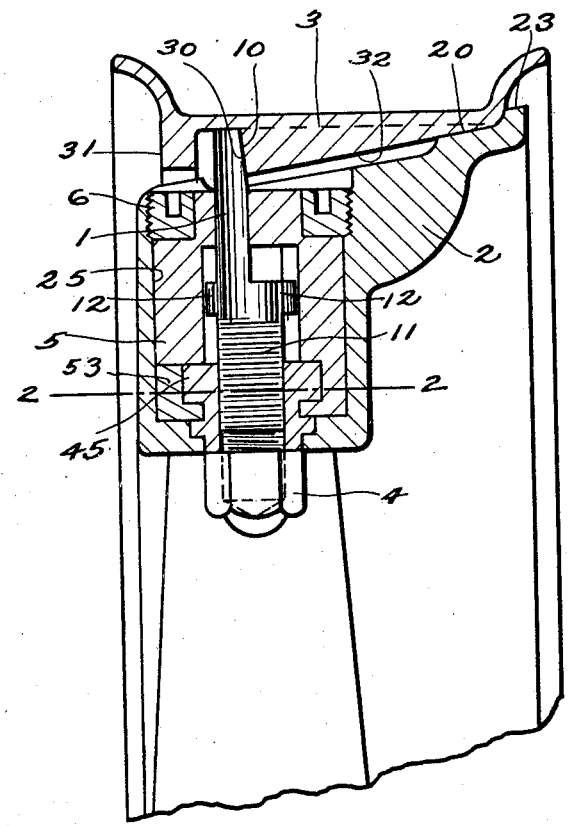
Figure 1 is a section transversely of the felly and rim, showing one form of my locking bolt in locked position.
Figure 2:
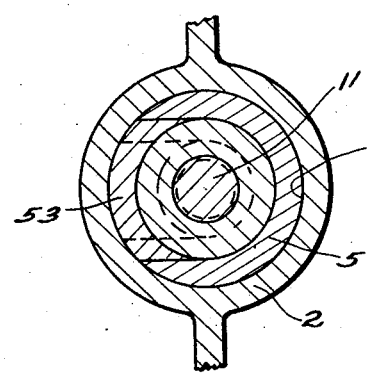
Figure 2 is a section on the line 2—2 of Figure 1.

In order to obtain the advantages, such as tightness of the rim, freedom from noise, and exact alignment of the tire, residing in the employment of a rim having its inner side inclined, or having inclined lugs, co-operating with similar inclines upon the felly, it is necessary to project a locking bolt radially through the felly, and it is necessary that this projectable bolt should have inclined surfaces co-operating with an incline on the rim to force the rim back upon the inclined felly. Hence, I have shown the locking bolt 1 having its face 10 inclined slightly from the general plane of the felly as mounted in the felly 20, so that it may project above the inclined surface 20 thereof to engage an inclined surface 30 of the rim 3, which rim has an inclined under surface 32 co-operating with the inclined surface 20 of the felly. Thus, projection of the bolt 1 forces the rim back up the incline 20 until it is stopped by a flange 23. A flange 31 at the outer side of the rim may be employed to cover the bolt end and to enhance the appearance of the wheel.

As representing one means for projecting the bolt 1, I provide threads 11 on its lower end, and wings 12. The threaded end 11 is received in a nut 4 swiveled within a casing 5 secured in the felly. The casing 5 is provided with a bore 51 for the reception of the bolt 1 and with grooves 52, or equivalent means, for the guidance of the wings 12 and to prevent rotation of the bolt. At its lower end the casing 5 is transversely grooved or cut out, as indicated at 54, to receive the collar 45 of the bolt 4, and a filler block 53 closes this groove 54 after the collar 45 has been received therein, and thus completes the swivel. The entire casing, including the filler block 53, is then received within a socket 25 of the felly, and is held in place therein by suitable means, such as the nut 6, which is threaded into the outer end of the recess 25 of the felley. Thus, the entire device is readily assembled and is securely held in place. By merely turning on the projecting head of the nut 4, the bolt 1 may be held projected or retracted. The nut 6 lies beneath the rim 3 and this nut, and consequently the casing 5 and bolt 1 can only be removed after the rim has been removed.

A somewhat simpler form is illustrated in Figure 4, but this differs from the form shown in the other figures chiefly in the manner in which the nut 4 is swiveled within the felly 2. The nut 1 and its relation to the felly and to the nut 4 are the same. In this view the nut 4 is shown as having a flange 44, by means of which it is received in a simple flanged nut 55 which threads into a recess in the inner periphery of the felly 2. To retain the nut 4 and to prevent its working in and out, and to provide a backing for forcibly retracting the bolt 1, I provide a ring 56 receivable in the central bore of the nut 55 and surrounding the bolt 1. This ring 56 acts as a spacer between the bottom of the recess 26 in the felly and the flange 44 of the nut 4. The guiding grooves corresponding to the grooves 52 are shown herein as grooves 27 in the felly itself, although it will be evident that these might be formed in such a member as the ring 56, which would be inserted as a bushing in the felly.

What I claim as my invention is:

1. A rim-locking device comprising, in combination with a rim and with the felly of a wheel having a socket opening at its outer periphery, a casing shouldered at its outer end and receivable in said socket, a securing nut secured in the mouth of said socket and engageable with the shoulder of said casing to retain it in its socket and lying beneath the rim, a clamping nut swiveled in the inner end of said casing, and engageable from the inner periphery of the felly, a bolt threaded in said clamping nut and projectable and retractable through said casing from the outer periphery of the felly, and radially thereof, upon manipulation of said clamping nut.

2. A rim-locking device comprising in combination with the felly of a wheel having a socket opening in its outer periphery, a two-part casing receivable in said socket and having an axial bore, said bore, when the casing lies in said socket, extending generally radially of the felly, a bolt non-rotatively receivable in said bore, its outer end being projectable beyond the outer periphery of the felly, and retractable thereinto, and its inner end being threaded, a nut threaded upon said bolt, and means in said socket for retaining the casing therein, one part of said casing being transversely grooved, and the other part being complemental thereto, and the nut having a circumferential groove forming a head receivable between the two parts of the casing, whereby said nut is swiveled in said casing, and is held in said felly projecting from its inner periphery.

Signed at Seattle, King County, Washington, this 17th day of November, 1926.

WILLIAM A. CLENCH.